United States Patent [19]

McCormick

[11] Patent Number: 5,141,085
[45] Date of Patent: Aug. 25, 1992

[54] HOIST LOAD BRAKE

[75] Inventor: Stephen J. McCormick, Shorewood, Wis.

[73] Assignee: Harnischfeger Corporation, Brookfield, Wis.

[21] Appl. No.: 608,875

[22] Filed: Nov. 5, 1990

[51] Int. Cl.⁵ .................................... F16D 63/00
[52] U.S. Cl. ................. 188/82.1; 188/187; 188/82.3; 188/71.1; 188/72.7; 188/72.7; 192/7; 192/8 A; 254/344; 254/347; 254/903
[58] Field of Search ............ 188/71.1, 71.2, 72.1, 188/72.7, 72.8, 82.9, 82.3, 82.34, 82.1, 82.2, 180, 187; 254/344, 362, 903, 346, 347, 365, 366, 357; 192/7, 8 A

[56] References Cited

U.S. PATENT DOCUMENTS

| | | | |
|---|---|---|---|
| 2,053,055 | 9/1936 | Wadd | 254/362 X |
| 2,263,064 | 11/1941 | Allin | 254/347 X |
| 3,049,340 | 8/2962 | Magnuson | 254/344 |
| 4,118,013 | 10/1978 | Christison et al. | 254/344 |
| 4,227,680 | 10/1980 | Hrescak | 254/344 |

FOREIGN PATENT DOCUMENTS 2048201 12/1980 United Kingdom .............. 254/362

OTHER PUBLICATIONS

Harnischfeger Corp., "Beta Hevilift", 2-9.
Harter, "Mechanical Load Brakes", Sep. 13, 1965, pp. 140-143.
Harnischfeger Corp. drawing, "Load Brake Shaft Assembly", Apr. 4, 1978.

*Primary Examiner*—Robert J. Oberleitner
*Assistant Examiner*—Peter M. Poon
*Attorney, Agent, or Firm*—Richard C. Ruppin

[57] ABSTRACT

The invention involves a hoist for raising and lower loads. The hoist includes a drive motor, gearing, a load brake and a cable-winding drum. The drum has an end with a splined annular member slidably engaging a similar splined annular member of a drum-concentric friction plate. The friction plate directly drives the drum during load raising and directly brakes the drum during load lowering. Because of the direct mechanical coupling between the drum and the friction plate, a failure in the gearing does not impair the ability of the friction plate to brake the load. Further details of the invention are set forth in the specification.

20 Claims, 3 Drawing Sheets

HOIST LOAD BRAKE

FIELD OF THE INVENTION

This invention relates to a load sensitive load brake for a hoist and, in particular, to a load brake positioned coaxially with and rotatable independently of the hoist motor drive shaft.

BACKGROUND OF THE INVENTION

Load sensitive friction type load brakes for hoists in which braking discs rotate in engagement with friction discs only during lowering operation of the hoist to restrain the lowering speed and thereby enable motor control of the load are known as "Weston" brakes and are well-known. Load sensitive friction load brakes are commonly of two types. One of these is an in-line brake arrangement in which the motor drive shaft, the shaft about which the friction plates rotate, and the drum axis of rotation are in alignment and rotate in the same direction during a raising or lowering operation of the hoist. Another type of load sensitive friction load brake uses a counter-shaft arrangement in which a gear drive is provided from the motor/drum drive shaft to one side of the drive shaft drum and the friction discs rotate about a separate shaft to one side of and parallel to the motor/drum drive shaft. The brake restraining force is provided through a second gear connection back to the motor/drum drive shaft.

The counter-shaft type of load sensitive load brake presents the problem of occupying a large amount of space. Such bulkiness is particularly undesirable in hoists which occupy a large amount of space due to use of a planetary or fixed compound differential reduction gear drive in addition to the regular motor and hoist brake. In-line types of load sensitive load brakes are also undesirable where large gear drives, such as planetary or fixed compound differential gear drives are used, since use of an in-line load brake requires placing the motor, the gear drive, as well as the load brake, at the same end of the hoist drum. This results in a highly unbalanced hoist apparatus which presents undesirable problems in suspending the hoist from its overhead support. The present invention is an improvement in load sensitive load brakes which eliminates the problems described above in both the counter-shaft and in-line type of load brakes.

SUMMARY OF THE INVENTION

It is a general object of this invention to provide a load sensitive load brake for a hoist which is positioned coaxially of the hoist motor drive shaft and rotates independently of the motor drive shaft. It is also an object of this invention to provide a load sensitive load brake which directly drives a hoist drum and permits the hoist drive motor and gear drive to be located at opposite ends of the hoist drum.

The invention is carried out in a hoist having a rotating drum and a drum drive motor positioned adjacent a first end of the drum by providing a motor drive shaft extending through the drum and projecting out a second end of the drum opposite the motor end of the drum. A gear drive is affixed to the end of the motor drive shaft projecting from the second end of the drum for reducing the drive speed of the motor, and a toroidal drive shaft is positioned coaxially of the motor drive shaft and is affixed to and extends from the drive gear means towards the second end of the drum. The load brake is positioned coaxially of and affixed to the toroidal drive shaft between the gear drive and the second end of the drum for transmitting rotating drive force from the gear drive to the drum and braking a load on the drum and the motor during lowering of a load on the hoist.

A friction plate adjacent the second end of the drum and the second end of the drum each have circumferentially positioned meshing gear teeth for driving rotation of the drum by the load brake means. The gear teeth are preferably axially directed splines which may have an involute gear profile.

The load brake means including the meshed gear teeth of the drum is disposed coaxial with and radially spaced from the motor drive shaft so that the gear teeth rotate independently of the motor drive shaft. The splines are slidable in axial directions to permit the load brake to also move in axial directions. Axial movement of the load brake enables engagement of friction surfaces to restrain the speed of the hoist during a lowering operation and separation of friction surfaces during a raising operation when the brake restraining effect is not desired.

BRIEF DESCRIPTION OF THE DRAWINGS

Further objects and advantages of the invention will appear when taken in conjunction with the accompanying drawings, in which:

FIG. 5 is a side elevation view, partially in cross-section, showing the position of the load brake during a lowering operation; and FIG. 6 is a cross-sectional elevation view illustrating an alternate embodiment of the invention.

DETAILED DESCRIPTION OF THE INVENTION

Figure 1:
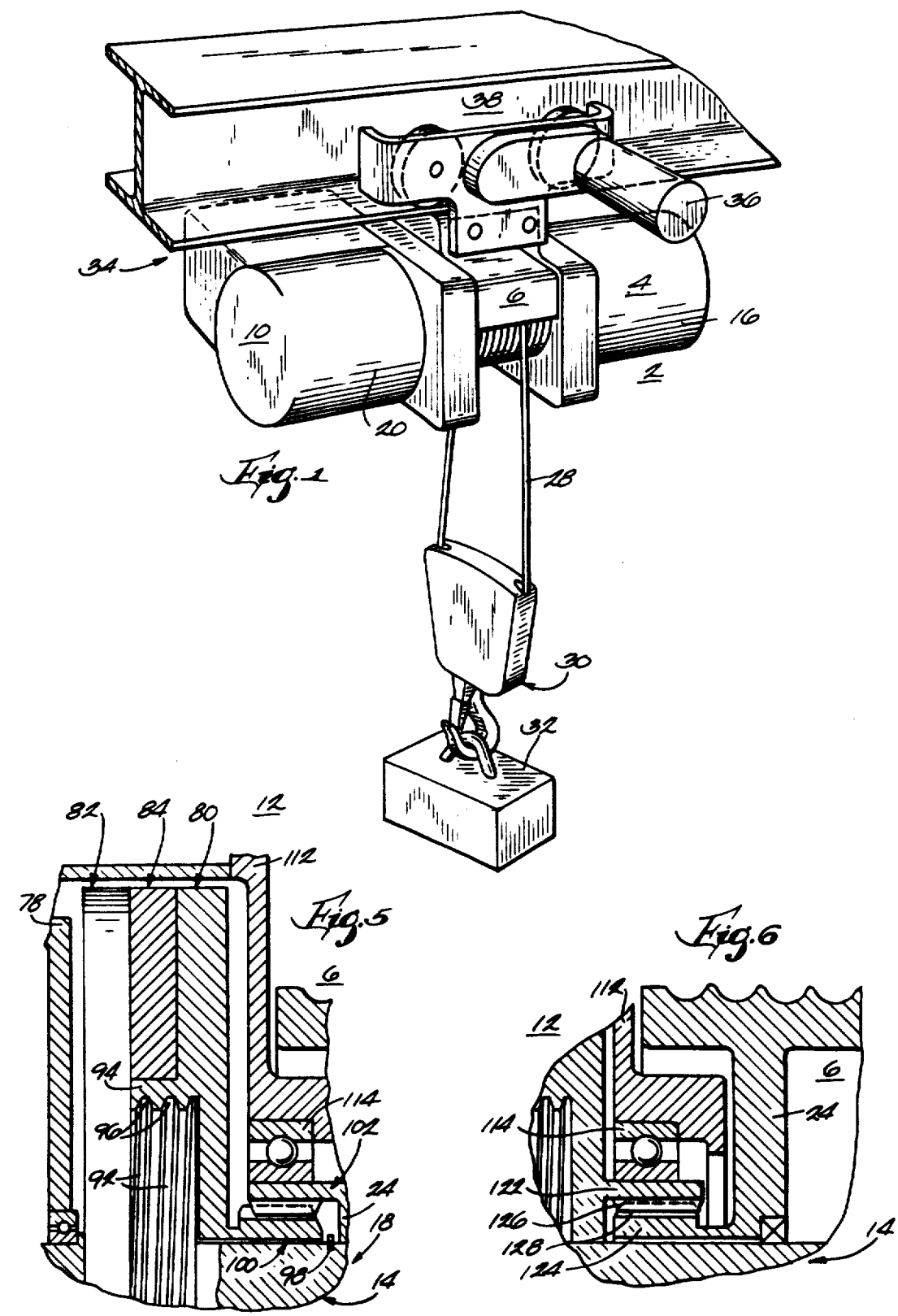
FIG. 1 is a perspective view illustrating a hoist incorporating the load brake of the invention.
Figure 2:
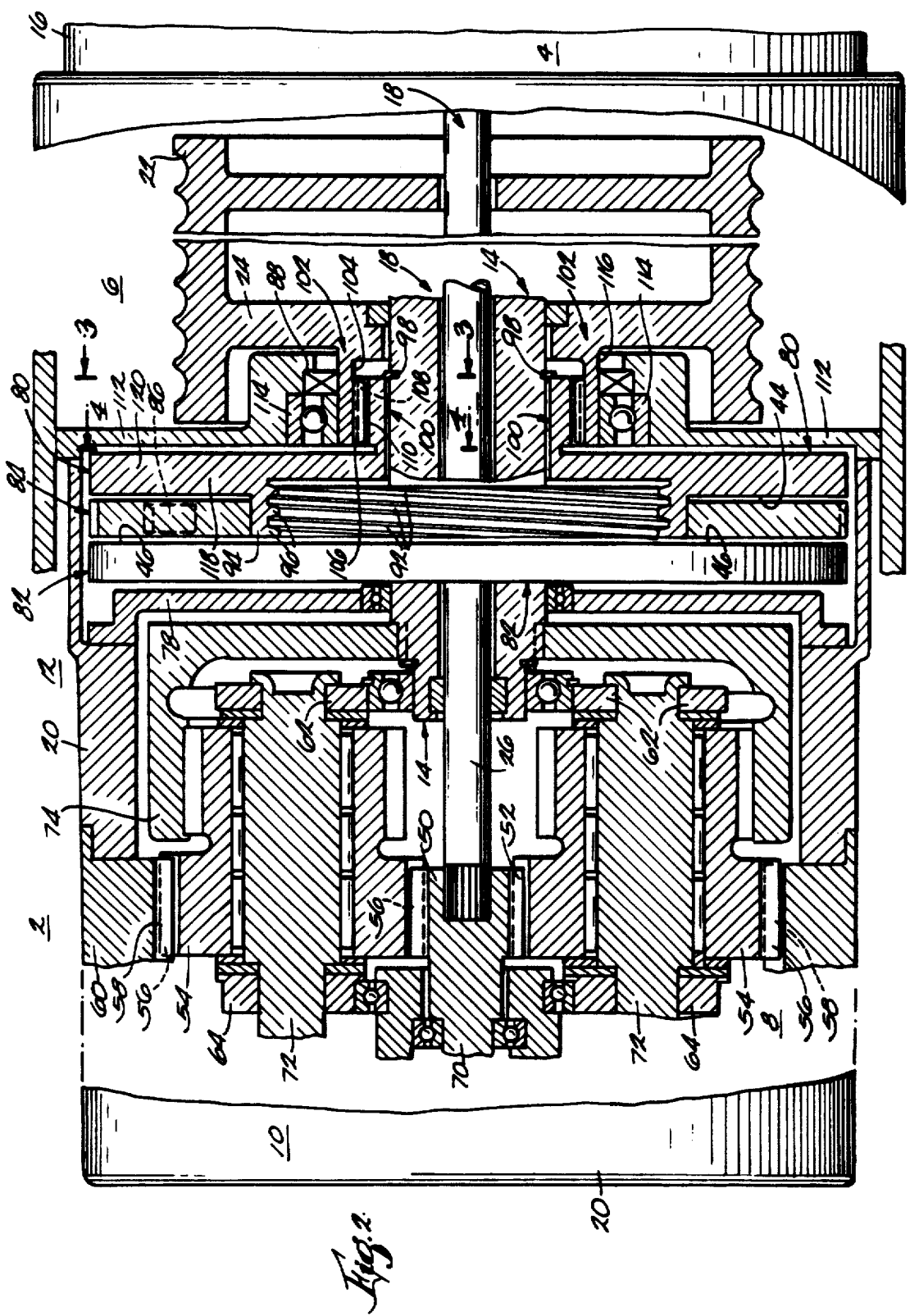
FIG. 2 is a side elevation view, in partial cross-section, illustrating several sections of the hoist shown in FIG. 1.

Referring generally to FIGS. 1 and 2, the hoist according to the invention includes a frame 2, a motor 4 mounted on the frame 2 within a motor housing 16 comprising part of the frame, a drum 6 rotatably mounted on the frame 2, a gear drive 8, a hoist brake 10 and a load brake 12. The motor 4 has a drive shaft 18 which extends from adjacent a first end 22 of the drum 6 through the drum and projects out of the drum at a second end 24 of the drum to the gear drive and hoist brake 10. The hoist brake 10 is connected to the end 26 of the motor drive shaft 18 through a motor pinion gear shaft 70 and the gear drive 8 is also connected to the end 26 of the motor drive shaft at a position spaced from the second end 24 of the drum 6. A toroidal drive shaft 14 is positioned coaxially with the motor drive shaft 18 and is affixed to the gear drive 8 and the load brake 12 to connect the rotating drive of the gear drive 8 to the load brake 12. The load brake 12 is positionable in rotating drive engagement with the second end 24 of the drum 6, as will be described in greater detail hereinafter. The gear drive 8, hoist brake 10 and load brake 12 are contained in a gear and brake housing 20 which comprises part of the frame 2.

A rope 28 is affixed to and wrapped around the drum 6. As the drum rotates in a forward or lowering position, as indicated by the direction of the arrow a in FIG. 3, rope is paid out from the drum to lower the load 32 on the hook and block 30 attached to the rope 28, and rope is taken up and wrapped onto the drum as the drum rotates in a reverse or raising direction, as indicated by the direction of the arrow b in FIG. 4, to lift the load 32. The hoist is suspended from a beam rail 34 by a trolley 38 which is driven along the rail 34 by a motor 36. Thus, the hoist travels along the rail to work locations where loads are to be picked up or deposited. The motor 4 is mounted on the frame 2 adjacent the end 22 of the drum and the gear drive 8 and hoist brake 10 are mounted on the frame 2 relatively adjacent the opposite end 24 of the drum. Consequently, the hoist is well-balanced and easily carried by the trolley 38. The hoist brake 10 operates to stop and hold the drum 6 and motor 4 in a well-known manner.

The gear drive 8 includes a motor pinion gear 50 affixed to the end 26 of the motor drive shaft 18, and three planetary compound gears 54 (one of which is not shown) equally circumferentially spaced apart about the motor pinion gear 50. The three planetary gears each include gear teeth 48 and 56. The teeth 56 are in driving engagement with gear teeth 52 of the motor pinion gear 50 and in engagement with gear teeth 58 of a fixed ring gear 60. The planetary gears 54 are supported by pins 72 extending through a pair of ring carriers 64 respectively supported by bearings 66 and 68 supported in turn on the toroidal drive shaft 14 and the motor pinion gear shaft 70. An output ring gear 74, rigidly attached to the toroidal drive shaft 14, includes gear teeth 76 in driven engagement with the gear teeth 48 of the three compound gears 54. A section 78 of the frame 2 extends radially inward to support bearings 79 which, in turn, engage and support the toroidal drive shaft 14.

Figure 3:
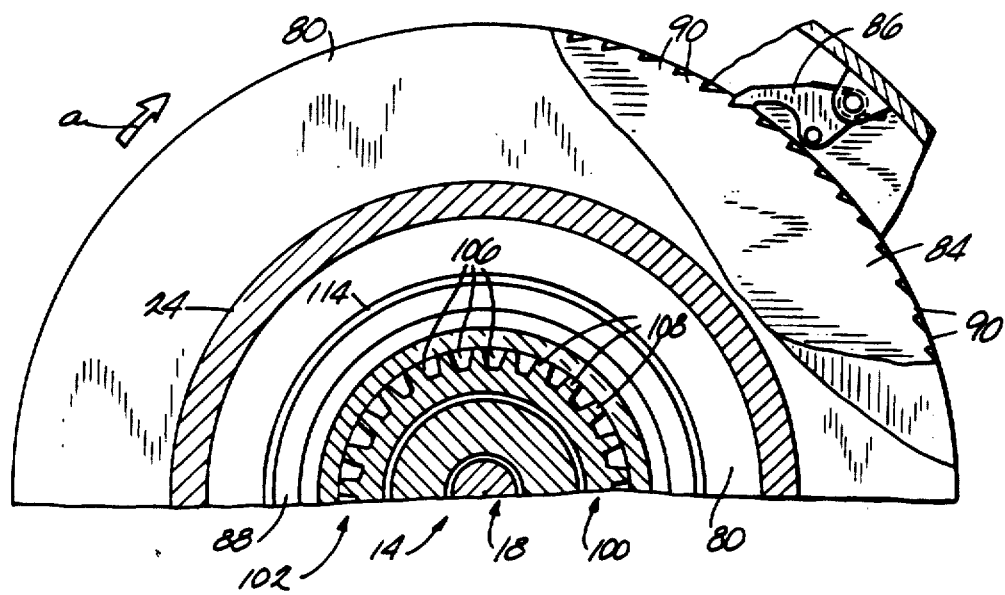
FIG. 3 is a cross-sectional view taken along lines 3—3 of FIG. 2, with frame portions removed for illustrative purposes showing the load brake during a lowering operation.

With reference to FIGS. 2, 3 and 5, the load brake 12 includes a first friction plate 80 positioned adjacent to the second end 24 of the drum 6, a second friction plate 82 spaced from the friction plate 80 and positioned adjacent the gear drive 8, a ratchet 84 positioned intermediate the friction plates 80 and 82, a pawl 86 engaging the ratchet teeth 90 of the ratchet 84, and a hub drive member 89 extending from the plate 82 having Acme threads 92 formed therein. The plates 80 and 82 respectively include friction surfaces 44 and 46 facing the ratchet 84. The second friction plate 82 and the hub drive member 89 including threads 92 may comprise an integral member rigidly affixed to and rotating with the toroidal drive shaft 14. The first friction plate 80 is positioned coaxially of and spaced from the motor drive shaft 18, and rotates at a different speed than, and at times independently of the motor drive shaft 18. The first friction plate 80 includes an annular member 94 extending from the end 118 of the plate 80 axially toward the gear drive 8 and having radially inward facing Acme threads 96 in meshing engagement with the Acme threads 92. The first friction plate 80 includes an annular member 100 positioned coaxially with and spaced from the motor drive shaft 18 and extending in an axial direction toward the second end 24 of the drum 6. The drum 6 has an annular member 102 extending axially toward the plate 80 and including radially inward facing, axially directed gear members 104 along its inner circumferential surface 106. The annular member 100 of the friction plate 80 includes radially outwardly facing, axially directed gear members 108 along its outer circumferential surface 110. The gear protrusions 104 and 108 are in meshed, driving engagement with each other so that the friction plate 80 and annular member 100 act as a drive member and the annular member 102 and drum end 24 act as a driven member. A section 112 of the frame 2 extends radially inward between the friction plate 80 and the second end of the drum 24 circumferentially around the annular members 100 and 102 and includes bearings 114 in engagement with the radially outward facing circumferential surface 116 of the annular member 102. A seal 88 is seated against the surface 116 of the annular member 102 adjacent the circumferential engagement location of the bearings 114 with the annular member 102. The gear protrusions 104 and 108 preferably are splines and have a cross-section profile transverse to their axial direction of an involute shape. Splines are desirable because they have a high torque transmitting ability which is necessary at the relatively small diameters of the annular members 110 and 102 and at the loads typically carried by the drum 6. An involute cross-section spline shape is also desirable since it provides maximum contact between meshed spline drive members and minimum frictional load. The minimum friction load permits ready axial sliding movement of the annular member 100 as the plate 80 moves axially.

The second end 24 of the drum 6 is supported by the support section 112 and the end 120 of the friction plate 80 is also supported by the support section 112 acting through the annular member 102 of the drum end 24. The end 118 of the plate 80 is supported in radial directions by the engagement of the annular member 94 with the Acme threads 92. The friction plate 80 is rotatable at a different speed than, and at times independently of the motor drive shaft 18, however, upon rotation of the plate 82 so that the Acme threads 92 on the plate 82 bear against the Acme threads 96 affixed to the plate 80, the friction plate 80 will rotate with the toroidal drive shaft 14, as will be discussed in greater detail hereinafter.

Figure 4:
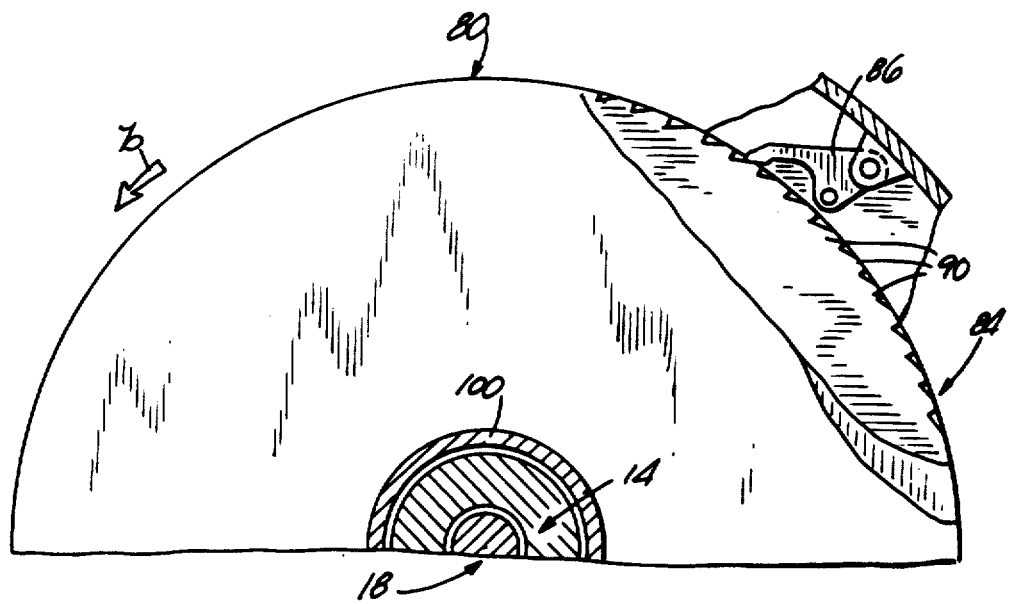
FIG. 4 is a cross-sectional view also taken along lines 4—4 of FIG. 2, with frame portions removed for illustrative purposes showing the load brake during a raising operation.

During a raising operation of the hoist, the toroidal drive shaft 14 and thereby the Acme threads 92 will rotate in the direction of the arrow b as illustrated in FIG. 4. With the pitch direction of the Acme threads 92 and 96 as shown in FIG. 2 and the rotation of the Acme threads 92 in the direction of the arrow b, the friction plate 80 will be advanced on the Acme threads 92 and 96 in a direction away from the ratchet gear 84 until the plate 80 tightens against snap ring 98, and the Acme threads 92 and 96 tighten against each other so that the friction plate 80 rotates with the Acme threads 92 and thereby with the toroidal drive shaft 14. Rotation of the friction plate 80 will then also be in the direction of arrow b as illustrated in FIG. 4, and the gear protrusions 108 of the annular member 100 will rotatably drive the annular member 102 of the drum end 24 and thereby the drum 6 also in the direction of the arrow b. As a consequence, the drum 6 will take up the rope 28 to raise the load 32 on the block and hook 30. When the drum rotation is in the direction of arrow b, and the plates 80 and 82 are spaced from ratchet 84, as shown in FIG. 2, the ratchet 84 may tend also to rotate in the direction of arrow b. The ratchet 84 is free to rotate in this direction since it is in the non-locking direction of pawl 86, as shown in FIG. 4. Thereby, since the plates 80 and 82 are spaced from ratchet 84, as shown in FIG. 2, the ratchet is free to rotate with the plates and there is no load braking action during raising operation of the hoist.

When the hoist is lowering a load, and the drum is rotating in the direction of the arrow a as illustrated in FIG. 3 to pay rope out from the drum 6, there is a frequent problem of the inability of the motor 4 to maintain control over the load so that the load quickly drops, as previously discussed. To avoid this problem, the toroidal drive shaft 14 rotates the Acme threads 92 to move the plate 80 axially toward and into engagement with the ratchet 84 when the shaft 14 is rotating in the direction of arrow a. Movement of the friction plate 80 axially towards the ratchet 84 also moves the ratchet toward and engages the ratchet 84 with the friction plate 82 so that the friction surfaces 44 and 46 engage the ratchet. The position of the plates 80 and 82 in engagement with the ratchet 84 during a lower operation is shown in FIG. 5. As shown in FIG. 3, during rotation of the toroidal drive shaft 14 and thereby during rotation of the friction plates 80 and 82 in the direction of arrow a, the pawl 86 engages the ratchet teeth 90 such that the ratchet 84 is held stationary and does not rotate. Consequently, during the rotation of the friction plates 80 and 82 in engagement with the ratchet 84 as the drum 6 rotates in a lowering direction, the rotation speed of the drum 6 is restrained so that control over the drum and load is not lost by the motor 4.

With reference to FIG. 6, an alternative embodiment of the invention is shown in which the friction plate 80 has an annular member 122 extending axially toward the end 24 of the drum 6. The end 24 of the drum has an annular member 124 extending axially toward the plate 80. However, unlike the embodiment of the invention illustrated in FIGS. 2-5, the member 122 extending from the plate 80 is radially outward of the annular member 124 extending from the end 24 of the drum. The annular member 122 has radially inward facing axially extending gear members or protrusions 126 which are preferably involute cross-section splines. The annular member 124 has radially outward facing axially extending gear members 128 which are preferably involute cross-section splines and mesh with the splines 126. The bearings 114 are supported by support member 112 and, in turn, support the annular members 122 and 124. The member 122 drives the member 124 through the meshed splines and thereby rotates the drum 6. The splines 126 are slidable axially with the plate 80 relative to the splines 128 of drum end 23 similar to the splines 106 in the embodiment of FIGS. 2-5.

During either raising or lowering operations, it is critical that the friction plate 80 be able to move in an axial direction either toward the ratchet 84 and friction plate 82 during lowering to provide load braking or away from the ratchet 84 to prevent load braking during raising. Thus, it is important that the friction plate 80 be able to move in an axial direction relative to the drum 6. The axially directed gear protrusions disclosed herein enable such relative sliding movement. In particular, use of involute splines enable the needed necessary sliding movement since the contact of the involute splines, for example, between the two annular members 100 and 102 is of a surface contact type along the length of the splines rather than of a line contact type. Thereby, the plate 80 is subject to minimal frictional restraint during sliding movement.

It will be understood that the foregoing description of the present invention is for purposes of illustration only and that the invention is susceptible to a number of modifications or changes, none of which entail any departure from the spirit or scope of the present invention as defined in the hereto appended claims.

What is claimed is:

1. In a hoist having a rotating drum including first and second ends and a rotation axis, and motor means positioned adjacent to the first end of the drum and for driving the drum to raise and lower a load, the combination comprising:

a motor drive shaft coaxial with the rotation axis and extending through the drum, the shaft having an end extending out of the second end of the drum;

gear drive means affixed to the end of the motor drive shaft and spaced from the second end of the drum for reducing the drive speed of the rotor;

a rotatable toroidal drive shaft affixed to the gear drive means, the toroidal drive shaft coaxially surrounding the motor drive shaft and extending from the gear drive means toward the second end of the drum; and load brake means including a first friction plate connection means associated with said torroidal drive shaft; operatively associated with said connection means and having a splined rotatable annular driving member in direct driving engagement with the second end of the drum and transmitting rotating drive force from the gear drive means directly to the drum and directly braking the load on the drum during load lowering.

2. The combination according to claim 1 wherein the hoist has a frame and the combination further comprises support means mounted on the frame and extending between the load brake means and the second end of the drum for supporting the load brake means and the drum concentric to one another.

3. The combination according to claim 1 wherein the first friction plate and the annular member are positioned coaxially of the motor drive shaft.

4. The combination according to claim 1 wherein the second end of the drum has a rotatable driven member affixed thereto, coaxial of the motor drive shaft and extending toward and into driven engagement with the splined annular member of the first friction plate for receiving the rotating drive force from the load brake means.

5. The combination according to claim 1 wherein:
   the second end of the drum includes a rotatable annular driven member positioned coaxially of the motor drive shaft and extending toward the load brake means; and wherein said rotatable annular drive member is positioned coaxially of the motor drive shaft and extending toward and into driving engagement with the driven member of the second end of the drum whereby rotating drive force is transmitted from the load brake means to the drum.

6. The combination according to claim 5 wherein the driving member and the driven member of the load brake means and second end of the drum, respectively, each have radially facing intermeshing spline gear surfaces whereby drive force is transmitted form the load brake means to the drum.

7. The combination according to claim 6 wherein said gear surfaces each comprise axially directed splines.

8. The combination according to claim 3, 4, 5, 6 or 7 wherein the hoist has a frame and the combination further comprises a support member mounted on the frame and extending between and coaxially to the load brake means and the second end of the drum, the support member supporting the driven member and driving member of the second end of the drum and the load brake means, respectively.

9. The combination according to claim 5, 6 or 7 wherein the hoist has a frame and:
the annular driving member and the annular driven member respectively of the load brake means and the second end of the drum each have a radially outward facing circumferential surface; and further comprising:
a support member mounted on the frame and positioned between the load brake means and the second end of the drum, the support member being positioned radially and in surrounding engagement with one of the circumferential surfaces of the annular driving member and the annular driven member whereby the load brake means and drum are supported in radial directions.

10. The combination according to claim 6 or 7 wherein the annular driving member extends axially into the annular driven member and includes radially outwardly directed spline teeth engaging radially inwardly directed spline teeth of the annular driven member.

11. The combination according to claim 10 wherein the hoist has a frame and the combination further comprises a support member mounted on the frame and positioned between the load brake means and the second end of the drum, the support member being positioned radially of and in surrounding engagement with the annular driven member of the second end of the drum.

12. The combination according to claim 1 wherein the first friction plate is positioned coaxially of and radially spaced from the motor drive shaft and rotatable at a different rate than the motor drive shaft.

13. The combination according to claim 12 wherein the friction plate is radially spaced from the toroidal drive shaft.

14. The combination according to claim 13 wherein the hoist has a frame and the combination further comprises support means mounted on the frame and positioned between the friction plate and the second end of the drum for supporting the friction plate independently of the motor drive shaft and the toroidal drive shaft.

15. The combination according to claim 14 wherein:
the friction plate and the second end of the drum have radially facing engaged circumferential drive surfaces whereby drive force is transmitted to the drum;
one of the friction plate and the second end of the drum having a radially outward facing circumferential support surface; and
the support means is in surrounding engagement with said support surface whereby the friction plate and drum are supported in radial directions.

16. In a hoist having a rotating drum including first and second ends and a rotation axis, and motor means positioned adjacent to the first end of the drum for driving the drum to raise and lower a load, the combination comprising:

a motor drive shaft coaxial with the rotation axis and extending through the drum, the shaft having an end extending out of the second end of the drum;
gear drive means affixed to the end of the motor drive shaft and spaced from the second end of the drum for reducing the drive speed of the motor;
a rotatable toroidal drive shaft affixed to the gear drive means, the toroidal drive shaft coaxially surrounding the motor drive shaft and extending from the gear drive means toward the second end of the drum;
load brake means comprising a friction plate positioned coaxially of and radially spaced from the toroidal drive shaft and the motor drive shaft and rotatable at a different rate than the motor drive shaft, such friction plate having a second end facing toward the gear drive means and having an inward facing Acme thread meshing and in supporting engagement with an outward facing Acme thread;
such load brake means further including a hub drive member positioned coaxial with and surrounding the motor drive shaft and being rigidly affixed to the toroidal drive shaft and having a radially outward facing Acme thread engaging the inward facing Acme thread;
the load brake means being in driving engagement with the second end of the drum and positioned coaxially of and affixed to the toroidal drive shaft between the gear drive means and the second end of the drum for transmitting rotating drive force from the gear drive means to the drum and braking the load on the drum and the motor during lowering of the load by the drum;
support means mounted on a frame and positioned between the friction plate and the second end of the drum for supporting the friction plate independently of the motor drive shaft and the toroidal drive shaft;
the friction plate and the second end of the drum have radially facing engaged circumferential drive surfaces whereby drive force is transmitted to the drum;
one of the friction plate and second end of the drum have a radially outward facing circumferential support surface; and
the support means is in surrounding engagement with said support surface whereby the friction plate and drum are supported in radial directions.

17. The combination according to claim 16 wherein:
the motor drive shaft rotates in a first direction during load raising; and
the load brake means rotates in a second direction opposite that of the motor drive shaft during load raising.

18. In a hoist having a motor indirectly driving a rotating drum through gearing, an improved load brake wherein:
the drum includes an end having a splined annular member, connection means operatively associated with the gearing, and the load brake includes:
a first friction plate having a splined annular member in slidable engagement with that of the drum end, such friction plate separatively associated with said connection means and directly driving the drum during load raising and directly braking such drum during load lowering, whereby such friction plate directly brakes the drum notwithstanding a failure in such gearing.

19. The load brake of claim 18 wherein each annular member is splined about its entirety whereby such friction plate directly brakes the drum notwithstanding breakage of a spline tooth.

20. The load brake of claim 19 wherein the friction plate moves axially and the splines of each annular member are involute permitting axial sliding movement of the friction plate with respect to the drum end.

* * * * *